(12) United States Patent
Basham et al.

(10) Patent No.: US 10,740,004 B2
(45) Date of Patent: Aug. 11, 2020

(54) EFFICIENTLY MANAGING MOVEMENT OF LARGE AMOUNTS OBJECT DATA IN A STORAGE HIERARCHY

(71) Applicant: International Business Machines Corporation, Armonk, NY (US)

(72) Inventors: Robert B. Basham, Aloha, OR (US); Joseph W. Dain, Vail, AZ (US); Evangelos S. Eleftheriou, Rueschlikon (CH); Dean Hildebrand, Bellingham, WA (US); Stan Li, Austin, TX (US); Edward H. W. Lin, Tucson, AZ (US); Harold J. Roberson, II, Rochester, MN (US); Slavisa Sarafijanovic, Adliswil (CH); Thomas D. Weigold, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 14/793,706

(22) Filed: Jul. 7, 2015

(65) Prior Publication Data

US 2017/0010826 A1 Jan. 12, 2017

(51) Int. Cl.
*G06F 3/06* (2006.01)

(52) U.S. Cl.
CPC .......... *G06F 3/0619* (2013.01); *G06F 3/065* (2013.01); *G06F 3/0665* (2013.01); *G06F 3/0685* (2013.01)

(58) Field of Classification Search
CPC ...... G06F 3/0619; G06F 3/065; G06F 3/0665; G06F 3/0685
See application file for complete search history.

(56) References Cited

U.S. PATENT DOCUMENTS

| 8,010,764 B2 * | 8/2011 | Keller, Jr. | G06F 1/3225 711/157 |
| 8,838,931 B1 * | 9/2014 | Marshak | G06F 3/0605 710/74 |

(Continued)

FOREIGN PATENT DOCUMENTS

| EP | 2811411 A1 | 12/2014 |
| WO | 9854636 A2 | 12/1998 |
| WO | 2014045441 A1 | 3/2014 |

OTHER PUBLICATIONS

He et al., "Coordinating Parallel Hierarchical Storage Management in Object-base Cluster File Systems," Proceedings of 14th NASA Goddard—23rd IEEE Conference on Mass Storage Systems and Technologies (MSST2006), May 2006, pp. 219-233.

(Continued)

*Primary Examiner* — Ramon A. Mercado
(74) *Attorney, Agent, or Firm* — Zilka-Kotab, P.C.

(57) ABSTRACT

A computer program product is provided for efficiently managing storage in a multi-tiered storage system. The computer program product comprises a computer readable storage medium having program instructions embodied therewith. The program instructions are executable by a processor to cause the processor to receive a command from an application, where the command is directed to at least one object. The program instructions are further executable by the processor to cause the processor to determine storage for the at least one object in a multi-tiered storage system based on the command, and store the at least one object in accordance with the determined storage.

18 Claims, 8 Drawing Sheets

(56) References Cited

U.S. PATENT DOCUMENTS

| | | | |
|---|---|---|---|
| 8,843,459 B1* | 9/2014 | Aston | G06F 17/30067 |
| | | | 707/694 |
| 9,047,017 B1* | 6/2015 | Dolan | G06F 3/0653 |
| 9,052,830 B1* | 6/2015 | Marshak | G06F 3/064 |
| 9,542,326 B1* | 1/2017 | Throop | G06F 12/0866 |
| 2008/0021865 A1* | 1/2008 | Corkill | G06F 17/30315 |
| 2009/0144492 A1* | 6/2009 | Barth | G06F 12/0893 |
| | | | 711/106 |
| 2010/0114829 A1 | 5/2010 | Prahlad et al. | |
| 2011/0010514 A1* | 1/2011 | Benhase | G06F 3/061 |
| | | | 711/162 |
| 2012/0054428 A1* | 3/2012 | Butt | G06F 3/061 |
| | | | 711/111 |
| 2013/0073783 A1* | 3/2013 | Cao | G06F 3/0611 |
| | | | 711/103 |
| 2013/0151804 A1* | 6/2013 | Alatorre | G06F 17/30165 |
| | | | 711/170 |
| 2013/0326159 A1 | 12/2013 | Vijayan et al. | |
| 2013/0332685 A1 | 12/2013 | Kripalani et al. | |
| 2014/0019711 A1 | 1/2014 | Leggette et al. | |
| 2014/0173199 A1 | 6/2014 | Gupta et al. | |

OTHER PUBLICATIONS

Rahim, Y.B.A, "Spatio-Temporal Data Mining on Moving Objects In DBMS," PhD Proposal, Delft University of Technology, Nov. 15, 2007, pp. 1-33.

Seagate, "The Seagate Kinetic Open Storage Vision," Seagate Technology LLC webpage, accessed from http://www.seagate.com/tech-insights/kinetic-vision-how-seagate-new-developer-tools-meets-the-needs-of-cloud-storage-platforms-master-ti/, Jan. 2015, pp. 1-9.

* cited by examiner

EFFICIENTLY MANAGING MOVEMENT OF LARGE AMOUNTS OBJECT DATA IN A STORAGE HIERARCHY

BACKGROUND

The present invention relates to data storage systems, and more specifically, this invention relates to efficiently moving object data in a storage hierarchy.

Cloud storage is primarily comprised of object storage at a massive scale. Object storage provides very little control over optimizing retrieval of large amounts of data. For example, OpenStack Swift only provides for bulk delete of containers, or of accessing data in a single container. This may be a problem because, at the massive scale, such data may be stored hierarchically across multiple storage tiers, such as flash storage, disk storage, and tape storage. For example, data that hasn't been read for a few hours may be moved from flash storage to disk storage, and data that hasn't been read for a few weeks may be moved to tape storage. Each of these storage tiers has different performance latencies, throughput characteristics, and cost points.

Object storage services do not provide a way to specify object movement. For example, object storage services do not provide a way to expedite the bulk movement of data from the lowest cost storage tier. Furthermore, when an application needs to immediately retrieve a large amount of data, the data may reside on the slowest storage tier, such as tape. Still yet, if the data is on tape as a part of a near-line object storage service, the object storage service may hide the mapping of objects to tape, making it impossible for the user of the object storage service to know how to optimally recall those objects. If the application requests a sparse data set across many tapes randomly, the recall time for the data set may be orders of magnitude slower than if the data set has been requested optimally.

Similarly, when reading large numbers of blocks of data out of object storage systems, the read may be performed in a non-optimal way. For example, multiple copies of the data may be put out on disk in a way that can exaggerate seek times and negatively impact performance. Additionally, requests may come in for each block, file, or object individually, and each request may be handled individually with no attempt to re-order requests to minimize read seeks.

Finally, for large scale-out storage solutions, load balancing across several nodes may help handle the high bandwidth needs of such services. These services may be designed to be multi-tenant and scale to very large sizes, sometimes with global geographic distribution of a service. Load balancing may require that all data enter through a single point before being distributed to the node actually processing the data.

BRIEF SUMMARY

A computer program product is provided for efficiently managing storage in a multi-tiered storage system. The computer program product comprises a computer readable storage medium having program instructions embodied therewith. The program instructions are executable by a processor to cause the processor to receive a command from an application, where the command is directed to at least one object. The program instructions are executable by the processor to further cause the processor to determine storage for the at least one object in a multi-tiered storage system based on the command, and store the at least one object in accordance with the determined storage.

Also, a computer program product is provided for efficiently handling batch requests. The computer program product comprises a computer readable storage medium having program instructions embodied therewith. The program instructions are executable by a processor to cause the processor to receive, from a client, a message identifying at least one object. The program instructions are executable by the processor to further cause the processor to generate a response to the message based on the at least one object identified in the message, and send the response to the client.

Still yet, a computer program product is provided for optimizing storage of data copies. The computer program product comprises a computer readable storage medium having program instructions embodied therewith. The program instructions are executable by a processor to cause the processor identify at least two disks for storing at least two copies of data, where each of the disks is for storing one of the copies of the data. The program instructions are executable by the processor to further cause the processor to select one of the disks of the at least two disks as a primary disk, and store one of the copies of the data to the primary disk, where the one of the copies of the data stored to the primary disk is stored within a predetermined region of the primary disk.

Other aspects and embodiments of the present invention will become apparent from the following detailed description, which, when taken in conjunction with the drawings, illustrate by way of example the principles of the invention.

DETAILED DESCRIPTION

Figure 1:
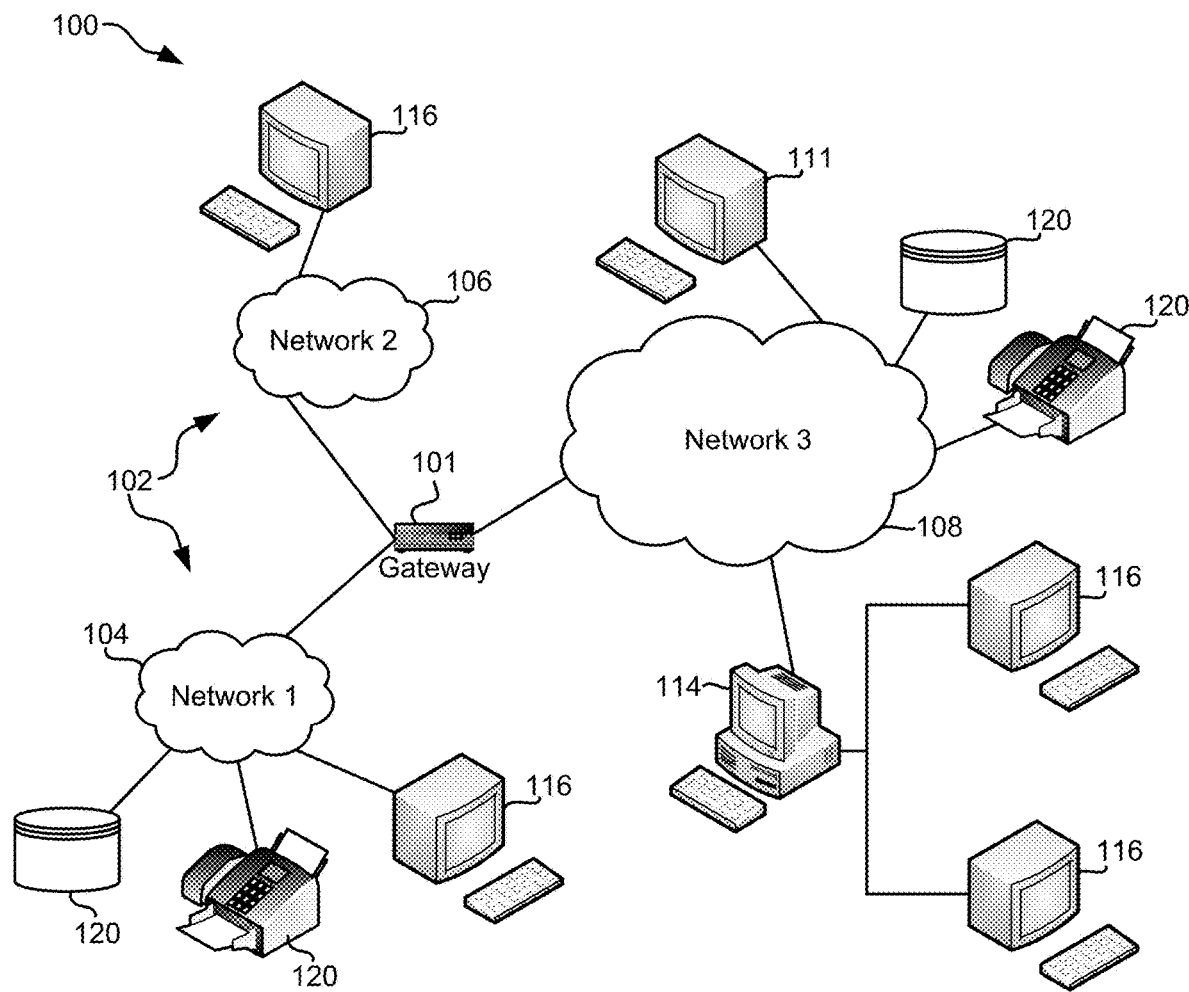
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for efficiently managing movement of object data in a storage hierarchy.

In one general embodiment, a computer program product is provided for efficiently managing storage in a multi-tiered storage system. The computer program product comprises a computer readable storage medium having program instructions embodied therewith. The program instructions are executable by a processor to cause the processor to receive a command from an application, where the command is directed to at least one object. The program instructions are executable by the processor to further cause the processor to determine storage for the at least one object in a multi-tiered storage system based on the command, and store the at least one object in accordance with the determined storage.

In another general embodiment, a computer program product is provided for efficiently handling batch requests. The computer program product comprises a computer readable storage medium having program instructions embodied therewith. The program instructions are executable by a processor to cause the processor to receive, from a client, a message identifying at least one object. The program instructions are executable by the processor to further cause the processor to generate a response to the message based on the at least one object identified in the message, and send the response to the client.

In another general embodiment, a computer program product is provided for optimizing storage of data copies. The computer program product comprises a computer readable storage medium having program instructions embodied therewith. The program instructions are executable by a processor to cause the processor identify at least two disks for storing at least two copies of data, where each of the disks is for storing one of the copies of the data. The program instructions are executable by the processor to further cause the processor to select one of the disks of the at least two disks as a primary disk, and store one of the copies of the data to the primary disk, where the one of the copies of the data stored to the primary disk is stored within a predetermined region of the primary disk.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
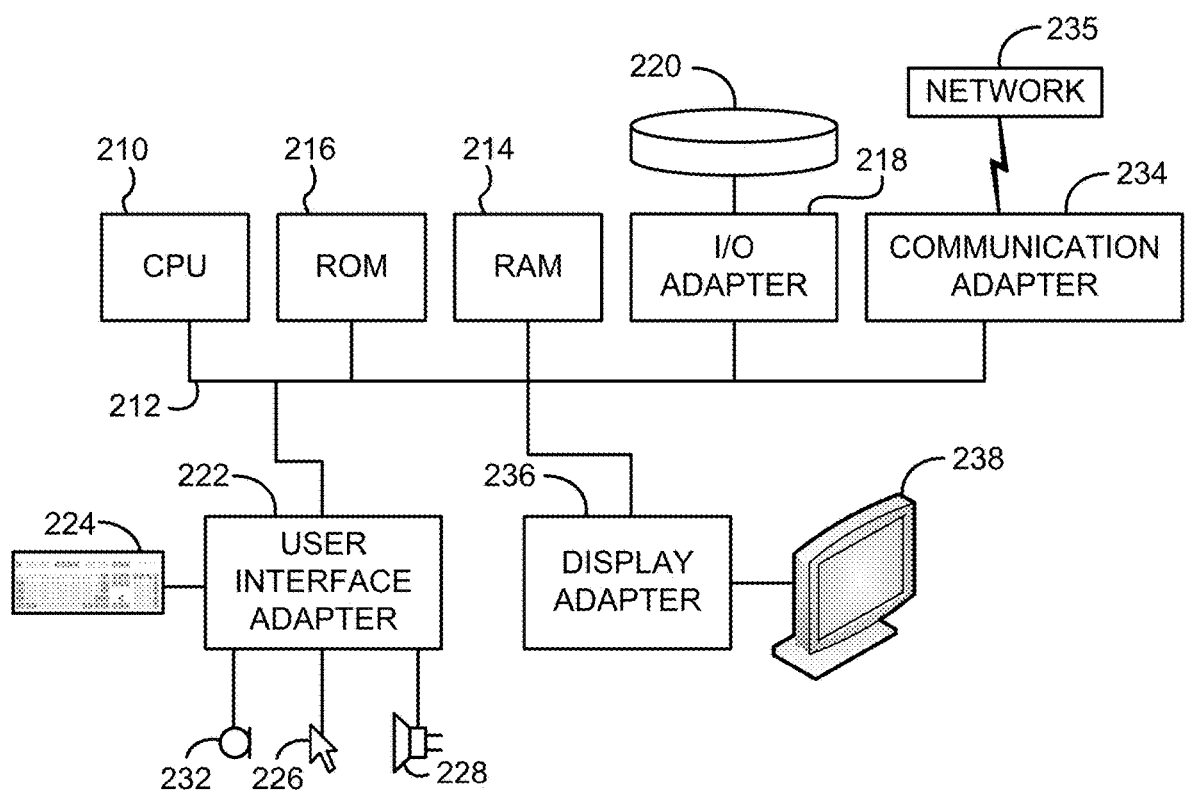
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
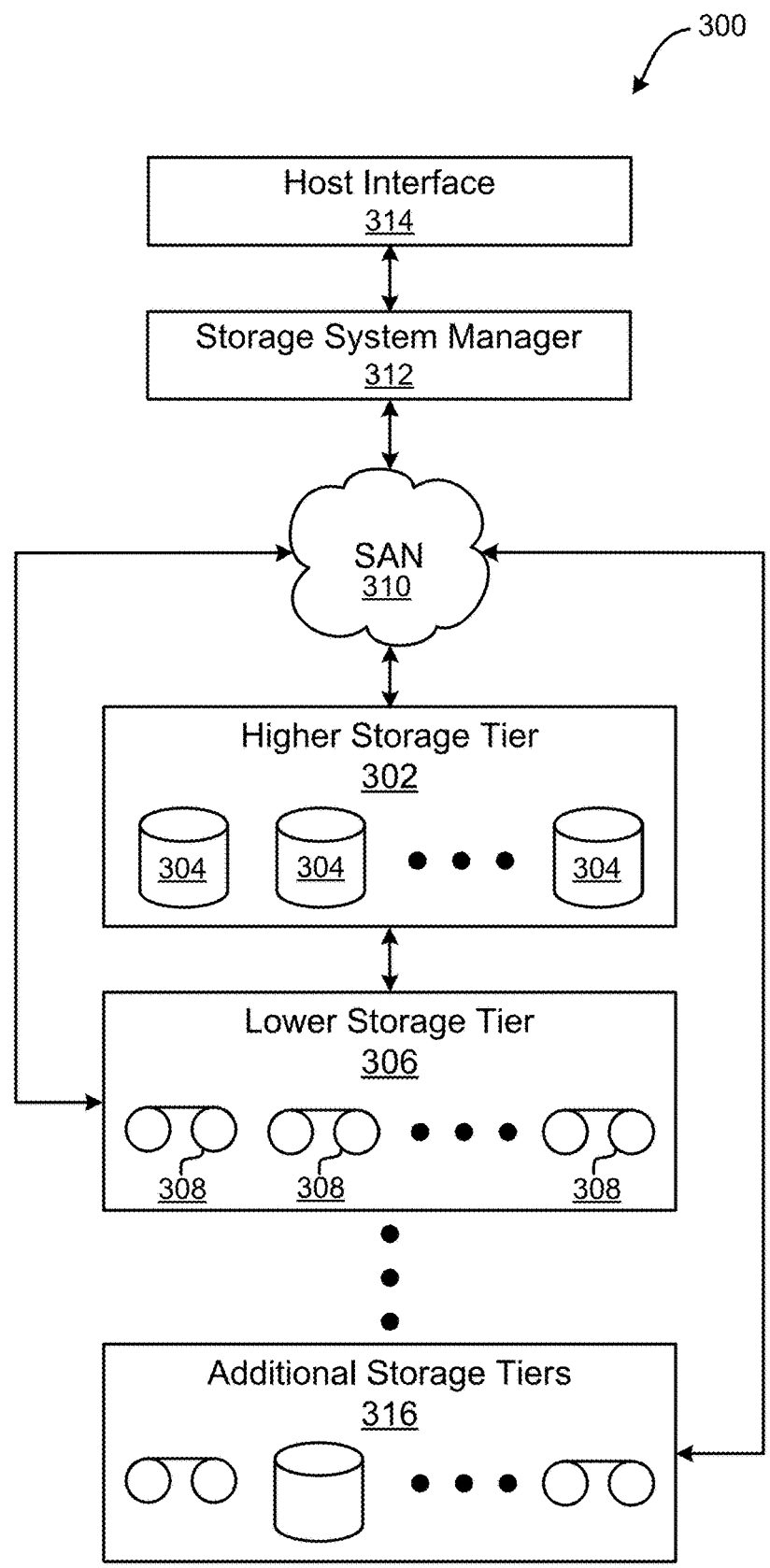
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
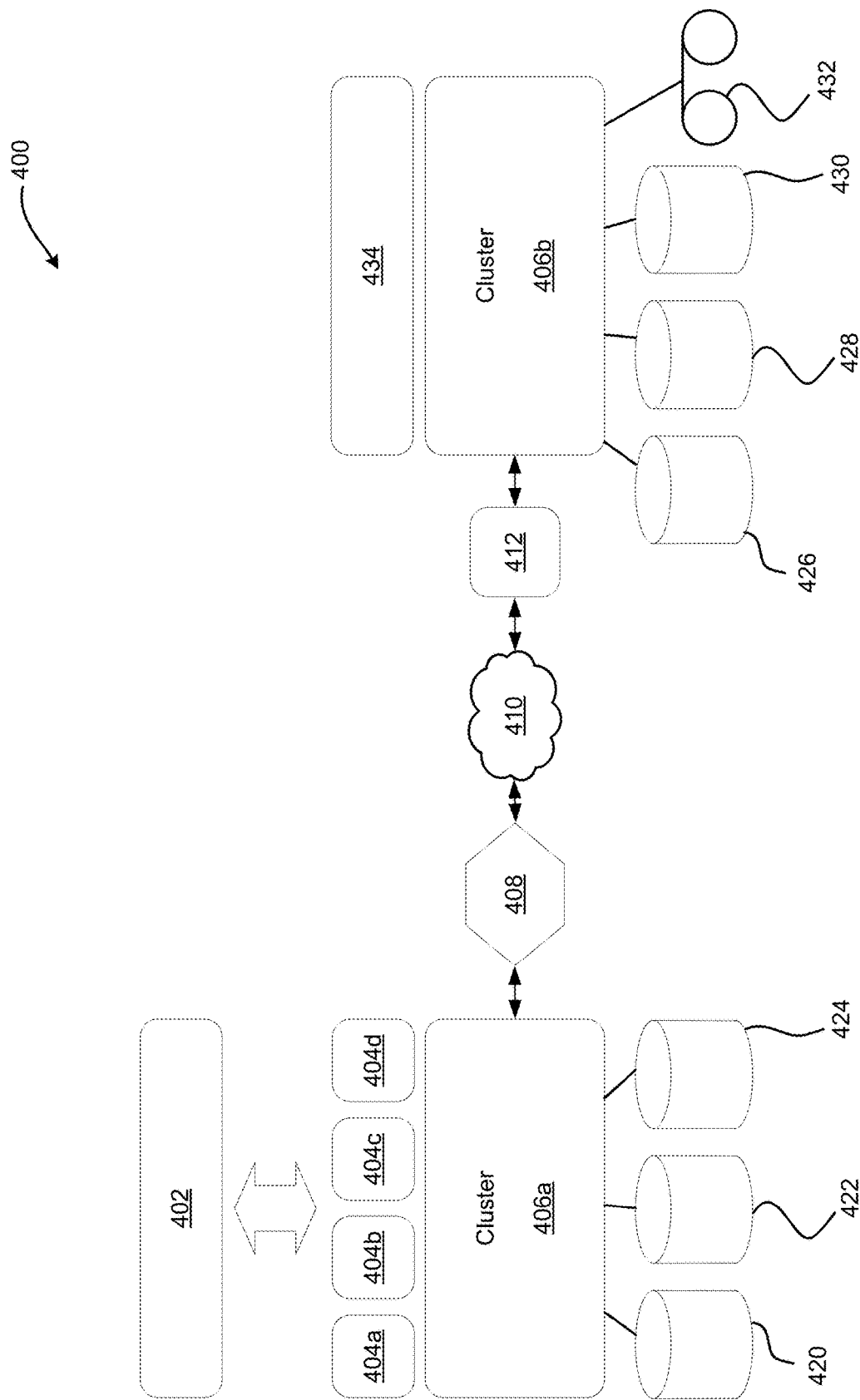
FIG. 4 illustrates a system for storing object data, in accordance with one embodiment.

FIG. 4 depicts a system 400 for efficiently managing movement of object data, in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

As shown in FIG. 4, the system 400 includes a storage application 402, a first cluster 406a and a second cluster 406b, a storage gateway 408, a cloud infrastructure 410, object storage platform 412, and an object storage service 434. In one embodiment, each of the clusters 406 may comprise a General Parallel File System (GPFS cluster).

The storage application 402 may communicate with the first cluster 406a using one or more standards and protocols 404. As shown in FIG. 4, the storage application 402 may communicate with the first cluster utilizing any of the four standards and protocols 404a, 404b, 404c, and 404d, however any number of standards and protocols may be implemented for communication between the first cluster 406a and the storage application 402.

In various embodiments, the storage application 402 may include any application that stores data to the clusters 406. Further, the object storage service 434 may include any service that provides network-based access to the file storage capabilities of the clusters 406.

In various embodiments, each of the standards and protocols 404 may be different from each other. For example, in one embodiment, the standards and protocols 404 may include a POSIX standard 404a, Network File System (NFS) protocol 404b, Common Internet File System (CIFS) protocol 404c, and WebSocket protocol 404d. Of course, in other embodiments, the standards and protocols 404 may be implemented as any known standards or protocols for accessing data.

Further, the storage gateway 408 includes any appliance or device that translates requests associated with a cloud storage application program interface (API) to another storage protocol. For example, the storage gateway 408 may translate requests of a cloud storage API to a block-based storage protocol (e.g., iSCSI, etc.) or a file-based storage protocol (NFS, SMB, etc.). Additionally, the storage gateway 408 is shown in communication with the cloud infrastructure 410, which is shown in communication with the object storage platform 412. The object storage platform 412 includes any interface through which an application may manipulate data stored as objects within a cluster. For example, in a particular embodiment, the object storage platform 412 may include OpenStack Swift, and the cloud infrastructure 410 may include SoftLayer Cloud. The clusters 406 may share data or communicate through the storage gateway 408, the cloud infrastructure 410, and the object storage platform 412.

The first cluster 406a is shown in communication with tiered storage 420-424. More specifically, the first cluster 406a is shown in communication with a first storage tier 420, a second storage tier 422, and a third storage tier 424. In various embodiments, each of the storage tiers may be associated with a different type of storage media. The types of storage media may be selected based on characteristics such as throughput, seek times, cost, archival reliability, etc. in a manner that most efficiently maximizes use of the tiered storage 420-424. For example, in one embodiment, the first storage tier 420 may include solid state drives, the second storage tier 422 may include fast hard disk drives, and the third storage tier 424 may include slow hard disk drives.

Similarly, the second cluster 406b is shown in communication with tiered storage 426-432. More specifically, the second cluster 406b is shown in communication with a first storage tier 426, a second storage tier 428, a third storage tier 430, and a fourth storage tier 432. In various embodiments, each of the storage tiers may be associated with a different type of storage media. The types of storage media may be selected based on characteristics such as throughput, seek times, cost, archival reliability, etc. in a manner that most efficiently maximizes use of the tiered storage 426-432. For example, in one embodiment, the first storage tier 426 may include solid state drives, the second storage tier 428 may include fast hard disk drives, the third storage tier 430 may include slow hard disk drives, and the fourth storage tier 432 may include tape media.

In use, data that hasn't been accessed for a first threshold period (e.g., minutes, hours, days, weeks, months, etc.) of time may be moved from a first storage tier to a second storage tier, such as, for example, from flash storage to disk storage. Further, data that hasn't been accessed for a second threshold period (e.g., hours, days, weeks, months, etc.) may be moved from the second storage tier to a third storage tier, such as, for example, from the disk storage to tape storage. While movement based on access is common, other movement criteria might be used. Thresholds for moving data between storage tiers may be configured within data management policies. As noted above, each of the storage tiers may have very different performance latency and throughput characteristics and cost points.

Figure 5A:
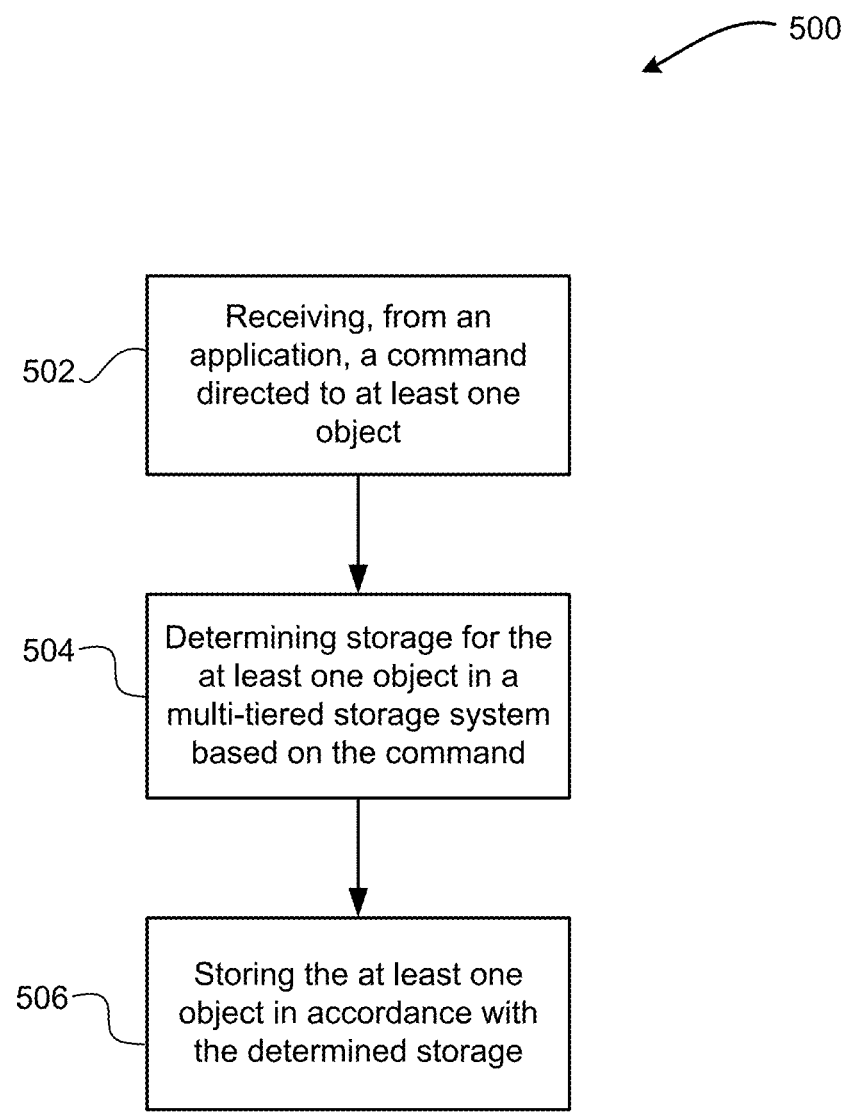
FIG. 5A illustrates a method for efficiently managing storage in a multi-tiered storage system, in accordance with another embodiment.

Now referring to FIG. 5A, a flowchart of a method 500 for efficiently managing storage in a multi-tiered storage system, is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, method 500 may initiate with operation 502, where a command directed to at least one object is received from an application. As used herein, an object may include any discrete unit of storage in a storage pool. Further, the at least one object may include any grouping or association of one or more objects. For example, the at least one object may include a set of objects, a container, or a complete storage tier. Still yet, the command may include a policy for a container or a storage tier, where the policy identifies a set of objects to move to another tier, or to collocate together when moving to a tape tier, as will be discussed in more detail below.

In one embodiment, the application may include any application that can store and/or retrieve objects from storage. For example, the application may include an object storage platform, such as OpenStack Swift.

At operation 504, based on the command, storage is determined for the at least one object in a multi-tiered storage system; and, at operation 506, the at least one object is stored in accordance with the determined storage. In this manner, the command may be utilized by an object storage service to ensure efficient storage of the at least one object.

In various embodiments, each object may be associated with metadata, and a command directed to an object may be included in metadata of the object. For example, an object may be received from an application with the metadata that includes the command. In some embodiments, the command may be included in metadata of a container of an object, or a storage tier. In this manner, the object may be tagged via the command as it is being stored. In other embodiments, a command directed to an object may be received independent of the object and the metadata of the object. The command may be provided using a REST service, or may be provided as an XML document.

In some embodiments, the command may include collocation guidance or anti-collocation guidance for the at least one object from the application. In one embodiment, the command including collocation guidance or anti-collocation guidance may be provided by the application when the application writes the at least one object. The collocation or anti-collocation guidance may be used by an object storage service to optimally store data of the at least one object for future read access.

More specifically, collocation guidance may be provided that directs the sequenced storage of multiple objects for future reads. For example, if an application, during a backup operation, provides a plurality of objects to an object storage service, without a command providing collocation guidance, the object storage service may not be aware that the objects are related. As a result, the objects may be moved to a plurality of different tapes during execution of one or more information lifecycle management policies that are responsible for moving data to a lower storage tier when the data has not been accessed for a period of time. If the objects are ever recalled (i.e., during a restore, etc.), then each of the tapes will need to be mounted and read. The mounting and reading of multiple tapes may be characterized by long seek times, as well as have adverse effects to the tapes.

In contrast, if the application, during the backup operation, provides the plurality of objects to the object storage service with a command providing collocation guidance, then, during execution of the one or more information lifecycle management policies, all of the objects may be moved to a single tape or a small subset of tapes. In a large object storage system, only some nodes may have access to the single tape or the subset of tapes. Therefore the collocation may involve object storage identifying the disk storage nodes that can write to the single tape or the small subset of tapes, directing the PUT requests for the to-be-collocated objects to the identified nodes, and using the identified nodes to initially store the to-be-collocated objects to disk and to move them to and from the single tape or the small subset of tapes. If the objects are ever recalled (i.e., during a restore, etc.), then only the one tape or the small subset of tapes may need to be mounted and read. As a result, backup and restore operations of the objects, especially where the data of the objects is retrieved largely in a sequential manner, may be made more efficient.

In another embodiment, collocation guidance may be provided for grouping objects based on other constructs that a storage application is aware of. For example, collocation guidance may be provided when trying to group things by file directory, or if the storage application is attempting to separate the data of different users in a manner that ensures the data of a single given user is stored in close proximity.

In yet another embodiment, the command may tag the at least one object as cold. For example, where the application intends for an object to not be accessed for a threshold period of time (e.g., hours, days, weeks, months, etc.), a command may tag the object as cold. Accordingly, the storage for the object may then be determined based on the object being tagged as cold. In particular, the storage determined for the object may include a low storage tier (e.g., slow disk, tape, etc.). In response to determining that the object should be stored in the low storage tier, the object may be moved to the low storage tier. The object may be moved to the low storage tier immediately, or during execution of one or more information lifecycle management policies. In this manner, an object storage service may conserve faster storage resources for objects that are more frequently accessed, or more likely to be accessed. This may reduce the need to operate more expensive, higher storage tiers.

In one embodiment, the command may include a document that identifies the at least one object. For example, a document may identify a plurality of objects that the application is about to read, or otherwise intends to access. Further, storing an object in accordance with the determined storage may include moving the object to a higher storage tier in response to receiving the document that identifies the object. In other words, in response to receiving the document, an object storage service may move the data identified in the document to a faster storage tier, such as flash storage or a fast hard disk drive. Thus, in such an embodiment, where the object has been stored on a lower storage tier, such as tape or a slow hard disk drive, the object may be moved up to a higher storage tier in response to the document. This may reduce the time required for the object storage service to satisfy the application's subsequent access requests for the object.

In use, an application may receive a recall or restore request requiring a read of a large set of objects. In response, the application may send, to an object storage service, a document that identifies the objects of the set. In response to receiving the document, the object storage service may move the data comprising the objects to the fastest storage tier. For example, if the data comprising the objects is currently on tape, then the object storage service may begin moving the data comprising the objects to flash storage or hard disk drive. As an option, if a socket connection is available, the object storage service may stream the data to the application as the data becomes available.

Further, where the document identifies a large set of objects, an object storage service may compute the most efficient way to recall the data. This may include mapping the objects to tape and location on tape, so that all of the objects identified in the document may be read using a single pass of a given tape in the optimal seek order. By reading the data in the most efficient manner from the tape, a critical bottleneck of near-line storage may be relieved.

In some embodiments, an application may send a message to an object storage service requesting the optimal order to issue GET requests. For example, the application may be executing a restore operation over the cloud. In response, the object storage service may determine the optimal order to issue the GET requests, and provide that order to the application. The object storage service may determine the optimal order based on where the objects have been stored in lower storage tiers, such as tape. The object storage service may leverage optimal ordering service present natively in tape devices. Of course, the objects may have been stored in the lower storage tiers based on previously received commands. The optimal order may be configured to stream as much as possible from one or more tapes, eliminating superfluous seeks and rewinds. In one particular embodiment, upon receipt of the message from the application, where the message lists a plurality of objects, the object storage service may, using data regarding the placement of the objects on tapes, re-order the objects in the list, and pass the re-ordered list back to the application. The application may then issue the GET requests in the order set forth in the re-ordered list.

In some embodiments, the re-ordered list may include multiple tiers of objects. For example, in one particular embodiment, the re-ordered list may include a different set of objects for each tape. Further, each set of objects may be ordered in a manner that corresponds to an order of the storage of the objects on the particular tape. Using these sets in the re-ordered list, the application may spawn parallel threads. For example, using these sets, the application may spawn a first thread to retrieve a first set of objects from a first tape, and a second thread to retrieve a second set of objects from a second tape. Accordingly, not only may multiple tapes be accessed in parallel, but because the objects have been ordered in each set to correspond to the ordering on the respective physical tape, the objects may be rapidly streamed from each tape.

Such a tiered process may also allow spanning across multiple tape libraries. For example, the application may, based on the re-ordered list, read a first set of data from a first tape kept at a first physical location in parallel with reading a second set of data from a second tape kept at a second physical location that is remote from the first physical location.

Still yet, after the object storage service provides the re-ordered list to the application, it may begin mounting storage containing the objects identified in the list, and moving the objects to a higher storage tier. In this manner, the object storage service may be able to more quickly respond to the subsequent GET requests that are expected from the application.

In other embodiments, the command may include a document that identifies a size of the at least one object. For example, in one embodiment, where the application intends to store one or more objects, the application may send a document that identifies a size of each of the objects. Further, a size of the objects individually or in the aggregate may be large. In other words, the application may identify to an object storage service an amount of data that the application will be sending to the object storage service. Storage for the objects may then be determined based on the sizes of the objects, and storage for the objects may be allocated for the objects prior to receipt of the actual objects.

Allocated storage may include any mix of storage from various storage tiers. For example, the object storage service may allocate storage space on a tape storage tier for a first portion of the data, and allocate storage space on a solid state disk storage tier for a second portion of the data. As noted above, this may occur, for example, if the application has identified that the first portion of the data is "cold," which may be indicated in a document received from the application. In this manner, an application may provide warning that it will be requesting storage of a large batch of data in the near future, and adequate storage may be efficiently identified and allocated in advance for the batch of data.

In another embodiment, the command may include guidance to an object storage service regarding an interval of execution of a storage tier policy. For example, the application may be configured to run, at predetermined intervals, storage tier policies to move data to the object storage service during a regular backup (i.e., a nightly backup, weekly backup, monthly backup, etc.). The command may provide the object storage service with notice of the predetermined intervals. Thereafter, the object storage service may perform housekeeping functions (e.g., internal storage re-balancing, etc.) at times least likely to impact the application. Accordingly, providing guidance to the object storage service regarding intervals of storage tier policies may help to ensure that the object storage service is able to allocate storage resources in a manner that avoids conflicts with any needs of the application.

In any of the embodiments disclose herein, an object storage service may send a message to the application. For example, the object storage service may provide guidance or instruction to the application, or may respond to a command, or other communication, from the application. As a more specific example, when an application has requested a large amount of data, for example by sending a command that includes a document identifying objects that the application is about to read, or otherwise intends to access, the object storage service may return the document with additional annotations. The additional annotations may include, for each object identified in the document, an optimal sequence for the application to read the objects. Still yet, the additional annotations may include, for each object identified in the document, predicted delays expected due to mount and/or seek times for accessing the object. In this manner, the application may receive data back from the object storage service with minimal latency, while retaining data request commands and infrastructure.

Moreover, the embodiments described above may be combined to realize even greater benefits. For example, an application may, during a migrate or backup operation that includes writing a large number of objects, provide collocation or anti-collocation guidance on the objects. Based on the collocation or anti-collocation guidance on the objects, an object storage service may optimally store the data for future read access. For example, the guidance may be provided in a command directed to the objects, and may identify a sequencing of the objects for future reads. In other words, the application may be programmed to know how data should be sequenced for backup services. Additionally, before sending the objects, the application may provide (e.g., via a send-ahead REST request, etc.) a size of the objects it will be sending, so that adequate storage may be allocated.

In some embodiments, the application may generate a command including collocation or anti-collocation guidance using a view of the users of a system. Using the view of the users, the application may ensure that object storage data is grouped by user. The command including collocation or anti-collocation guidance may be generated by the application in response to receiving a migrate or recall request. In some embodiments, the application may provide, via the command, a directive on collocation of data by directory.

In some embodiments, an object storage service receiving a command may use the command to sequentially place data (e.g., objects, files, etc.) received from an application on tape. The object storage service may, based on the command, ensure that a user's data is grouped together on the tape. The data may be received from a same thread.

In any of the embodiments noted above, a service, such as GPFS may maintain a mapping of objects to their locations in the various storage tiers. Further, as described above, an object interface may be provided that responds to GET and PUT requests of objects in different containers, and maps to a GPFS file system.

Figure 5B:
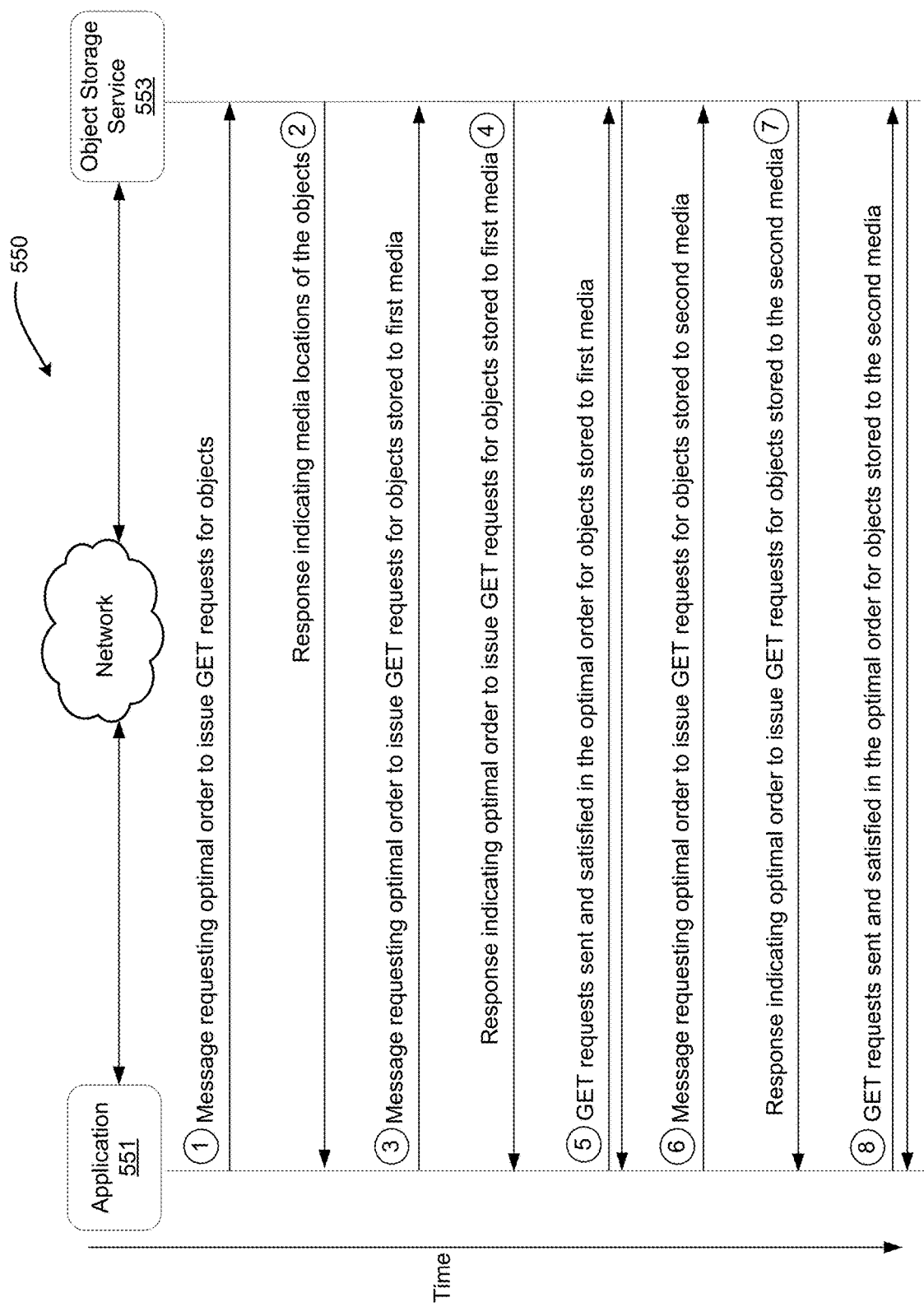
FIG. 5B illustrates a communication sequence for retrieving objects, according to one embodiment.

Referring now to FIG. 5B, a communication sequence 550 is illustrated for retrieving objects stored to multiple tiers of storage media. As an option, the communication sequence 550 may occur in conjunction with features from any other embodiment listed herein, such as those described with reference to the other FIGS. Of course, however, the communication sequence 550 may be used in various applications and/or in permutations which may or may not be specifically described in the illustrative embodiments listed herein. Further, the communication sequence 550 presented herein may be used in any desired environment.

As shown in FIG. 5B, an application 551 and an object storage service 553 communicate through a network. The application 551 may be substantially identical to the application described in the context of FIG. 5A, and the object storage service 553 may be substantially identical to the object storage service described in the context of FIG. 5A. The communication sequence 550 illustrated in FIG. 5B may occur where the application 551 has requested from the object storage service 553 objects that have been stored across multiple storage media of a lower storage tier, such as, for example, where the objects have been stored across multiple tapes.

The communication sequence 550 is shown to begin with the application sending a message that requests an optimal order to issue GET requests for a plurality of objects. As noted above, the application may be executing a restore operation over the cloud. The message may request an optimal order to issue GET requests for hundreds or thousands of objects, where the objects are stored across a plurality of different tapes. Upon receiving the message from the application 551, object storage service 553 may attempt to determine the optimal order to issue the GET requests.

In some embodiments, the object storage service 553 may have limited information regarding the location of where the objects are stored. For example, the object storage service 553 may access information about which media each of the objects is stored on, but may not be able to determine where each object is stored on its respective media. The media may include compact discs, tape, etc., or any other removable media utilized for storage purposes. In other words, the object storage service 553 may not have access to fine-grained information regarding the location or ordering of objects stored in a lower tier of storage (e.g., block level, etc.). Accordingly, media metadata for a given unit of media may be necessary for determining the optimal order to retrieve the individual objects stored to the media. However, the media metadata may only be accessible once the media has been mounted. Thus, the optimal ordering for retrieving objects from a given unit of media may not be known until the media is actually mounted for access.

In response to the message from the application 551, the object storage service 553 provides the application 551 with the media locations of the objects identified in the message. In one embodiment, the response to the application 551 may identify a respective media on which each of the objects is stored. For example, the response to the application 551 may identify that a first plurality of objects are stored to a first tape, a second plurality of objects are stored to a second tape, a third plurality of objects are stored to a third tape, etc.

Based on the response indicating media locations of the objects, the application 551 then requests an optimal order to issue GET requests for objects stored to a first media. For example, the application 551 may request an optimal order to issue GET requests for all objects that have been stored to a first tape. In response, the object storage service 553 may initiate a mount of the first media (i.e., a mount of a first tape, etc.), and, using the metadata of the first media, determine the optimal order of GET requests for objects stored on the first media. The optimal order to issue the GET requests for the objects stored to the first media is then provided to the application 551.

Next, the application 551 requests, in the optimal order provided by the object storage service 553, the objects stored to the first media. In response to the ordered requests for the objects stored to the first media, the object storage service 553 provides the objects to the application 551.

In parallel with the access of the first media, or subsequent to the access of the first media, the application 551 requests an optimal order to issue GET requests for objects stored to a second media. For example, the application 551 may request an optimal order to issue GET requests for all objects that have been stored to a second tape. In response, the object storage service 553 may initiate a mount of the second media (i.e., a mount of a second tape, etc.), and, using the metadata of the second media, determine the optimal order of GET requests for objects stored on the second media. The optimal order to issue the GET requests for the objects stored to the second media is then provided to the application 551.

Next, the application 551 requests, in the optimal order provided by the object storage service 553, the objects stored to the second media. In response to the ordered requests for the objects stored to the second media, the object storage service 553 provides the objects to the application 551.

Further, one or more additional instances of media may be accessed in a similar manner (e.g., third, fourth, fifth, etc. media). As noted above, the instances of media may be accessed in serial or in parallel. A number of the instances of media that are accessible in parallel may be limited by a number of mount points that are available to the object storage service 553. For example, where three mount points are available, and the application 551 intends to retrieve objects stored on four or more different media, the application 551 may simultaneously request an optimal order to issue GET requests for objects stored to the first, second, third, and fourth media. In response, the object storage service may, due to being limited by the three mount points, mount the first, second, and third media, and provide the application 551 with an optimal order to issue GET requests for the objects stored to each respective media. The application 551 may then issue GET requests for the objects stored to each of the first, second, and third media in the optimal order for each respective media. The GET requests may be satisfied, in turn, by the object storage service 553. In this manner, the first, second, and third instances of media may be accessed in parallel.

As retrieval is completed for the first, second, and third media, the media may be unmounted, and another media mounted for access. For example, if access of the second media completes before the first and third media, the second media may be unmounted, and the fourth media then mounted for access by the application 551. As described above, after the fourth media is mounted, the object storage service 553 may determine, and provide to the application 551, the optimal order to issue GET requests for objects stored to the fourth media. Using this optimal order, GET requests may be issued by the application 551 in a way that efficiently streams the objects from the fourth media.

In this manner, a multi-tiered approach is provided for allowing an object-based client to efficiently retrieve data that has been stored to lower tiers of storage that are not immediately accessible to an object storage service.

Figure 6:
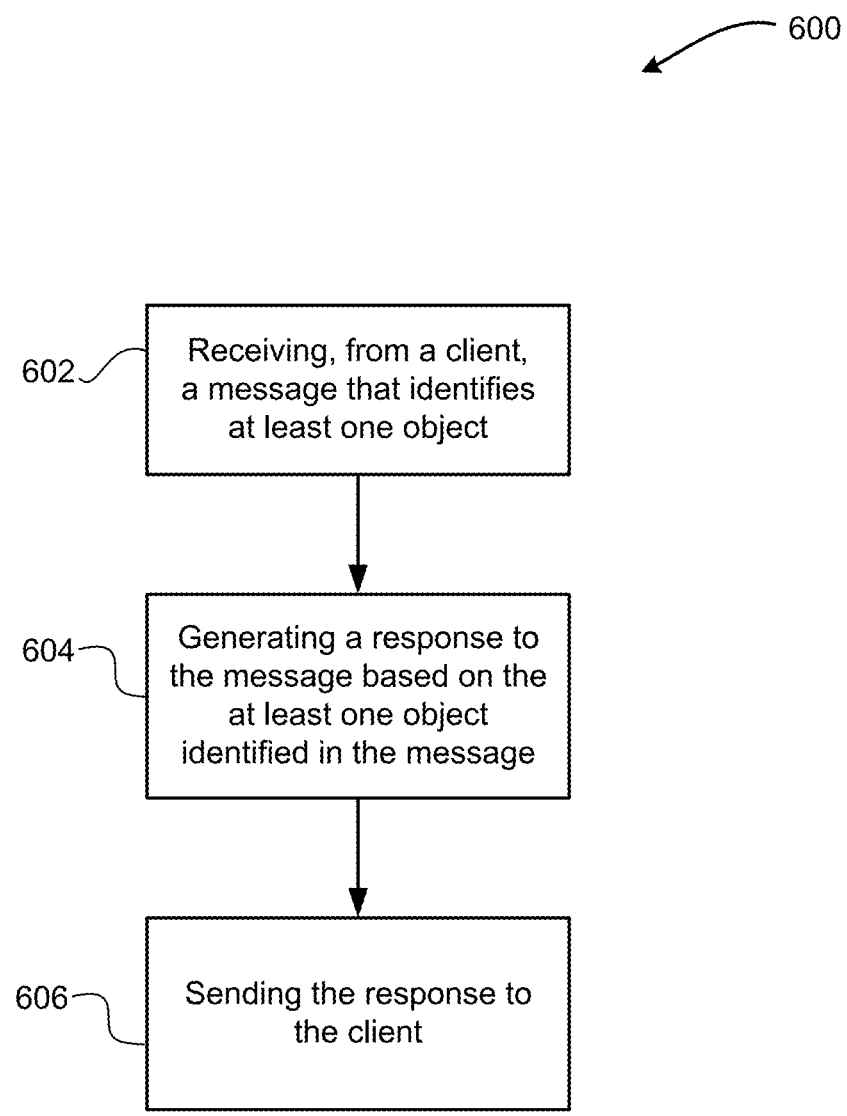
FIG. 6 illustrates a method for efficiently handling batch requests, in accordance with an embodiment.

Now referring to FIG. 6, a flowchart of a method 600 for efficiently handling batch requests is shown according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a message is received from a client. Further, the message identifies at least one object. The message may include any communication transmitted by the client that is capable of indicating the at least one object. The client may include any application and/or device capable of sending and/or retrieving data over a network.

In one embodiment, the message from the client may indicate that the client intends to store the at least one object. Still yet, the at least one object may comprise a large batch of data. In this way, the message may be sent by the client to indicate that the client intends to store tens, hundreds, thousands, etc. of objects to at least one node.

In another embodiment, the message from the client may indicate that the client intends to retrieve or read the at least one object. Still yet, the at least one object may comprise a large batch of data. In other words, the message may be sent by the client as a warning to indicate that the client will be requesting that a large batch of data be sent to client. For example, the client may intend to retrieve tens, hundreds, thousands, etc. of objects. In this manner, the message from the client may indicate that the client intends to retrieve the at least one object from at least one node.

Further, at operation 604, a response to the message is generated based on the at least one object identified in the message. In one embodiment, the response to the message may comprise a list. Further, the list may be annotated to indicate an association of a node with each object identified in the message.

For example, in one embodiment, where the message from the client indicates that the client intends to store the at least one object, the list may identify a node for storing each of the objects. As a specific example, where the client has indicated in the message hundreds of different objects, then the response to the message may indicate a node that is associated with each of the objects in the message. Each of the indicated nodes may be configured to store the object that it is indicated as being associated with. In this manner, the response to the client may identify one or more nodes that provide direct access or a guide for more balanced loading to the client for storing the at least one object identified in the request.

In another embodiment, where the message from the client indicates that the client intends to read the at least one object, the list may identify a node for accessing/reading each of the objects. In other words, the response to the message may indicate which node to route each object request to (e.g., a GET, etc.) so that the object may be read.

The list may identify nodes for storing and/or retrieving a plurality of objects in a manner that distributes a client's access across nodes in a balanced manner. In other words, an aspect of load balancing may be incorporated into the list that is provided to the client, such that the client's access of the nodes is balanced amongst the nodes. In this manner, a response to a client's bulk request may account for an optimal distribution of access across the nodes, obviating the need for separate load balancing functionality during subsequent client storage/retrieval requests for individual objects.

In various embodiments, the list may identify more than one node for one or more of the objects. More than one node for object storage/retrieval may be provided for access distribution purposes, or for exception handling purposes. For example, a list returned to the client may identify a primary node for the client to use for storing/retrieving an object, and may further identify one or more secondary nodes for storing/retrieving the object. When the client finds that the primary node is unavailable, the client may then attempt to store/retrieve the object to/from one of the secondary nodes. If a first attempt to store/retrieve the object to/from the one of the secondary nodes fails, then the client may attempt to store/retrieve the object to/from another one of the secondary nodes. In this way, when a node becomes unavailable due to network failure, node failure, etc. the client may continue to access objects from nodes in a predictable and controlled manner.

In some embodiments, the request from the client, and the response to the client may be REST based. In other embodiments, the request from the client, and the response to the client may be passed via a known file or object location.

Moreover, at operation 606, the response is sent to the client. The response may enable the client to directly send/retrieve data from nodes that will process the data, thereby avoiding a routing of the data through a load balancing service.

For example, in a particular prior art implementation, OpenStack Swift may use HAProxy in front of it to service all requests. Accordingly, all requests may come through HAProxy, and then be distributed to back-end nodes. Problematically, all requests may be forced to go through the extra hop of a load balancer, and the load balancer may become a bottleneck and a source of added latency.

In the embodiments disclosed herein, after receiving the response, the client may use the response to route each object identified in the message to the associated node indicated in the response. In this manner, the client may directly route each object identified in the message to the associated node indicated in the response, and bypass the use of any load balancing service when storing the objects. As used herein, a load balancing service may comprise any combination of load balancing software and/or hardware that distributes network traffic.

In another embodiment, after receiving the response, the client may use the response to request each object identified in the message by directing an appropriate request to the associated node indicated in the response. In this manner, the client may directly access each object identified in the message from the associated node indicated in the response, and bypass the use of any load balancing service when accessing the objects.

Accordingly, the client's message identifying the objects that it intends to send/retrieve may be understood as a warning or "heads-up" message to an object storage service, where the message indicates that a large batch of data will be sent/retrieved. The message may specify associated data objects or files. In response to the message, the storage service may return an annotated list indicating which node to route each associated object request to, without going through a load balancer.

In some embodiments, a load balancing solution (e.g., load balancing software and/or load balancing hardware, etc.) may be utilized for failover purposes. For example, if a client has received a response that identifies particular nodes for directing particular requests to, but the client is now unable to reach one or more of the nodes due to network or node failure, then the load balancing solution may be utilized. In one particular embodiment, after failing to access a listed node, the client may then default to sending a storage/retrieval request through a load-balanced gateway. The load-balanced gateway may then forward the client's request to a node that is different than the node that was previously identified in a response to the client. In this manner, traditional load balancing functionality may be removed from the primary performance path of object-based client access, such that traditional load balancing functionality is only utilized in the case of an error.

In one embodiment, where the message from the client identifies a plurality of objects that the client wishes to retrieve from multiple different media, a multi-tiered approach may be implemented for allowing the client to efficiently retrieve the data, as described in the context of FIG. 5B. For example, where the client has requested access to a plurality of objects, limited information may be available regarding the location of where the objects are stored. Accordingly, in response to the message from the client, the client may be provided with media locations of the objects identified in the message. For example, the response may identify a respective media on which each of the objects is stored (i.e., identify 500 objects that are stored on a first media, identify 200 objects that are stored on a second media, identify 300 objects that are stored on a third media, etc.).

Based on the response indicating media locations of the objects, the client may then request an optimal order to issue GET requests for objects stored to a first, second, and third media. In response to the client's request, the first, second, and third media may be mounted, and, the optimal order is determined for the client to issue GET requests for objects stored on each of the first, second, and third media. The client may then be provided with a list that identifies one or more nodes for retrieving each of the objects. The optimal order for access may also be included in the list, such that the client is then able to simultaneously retrieve the objects in an efficient and ordered manner from a plurality media via a plurality of nodes.

Although the method 600 of FIG. 6 is described as occurring with respect to objects, it is understood that the method may be equally applicable to a client that will be sending and/or receiving files to/from nodes.

Figure 7:
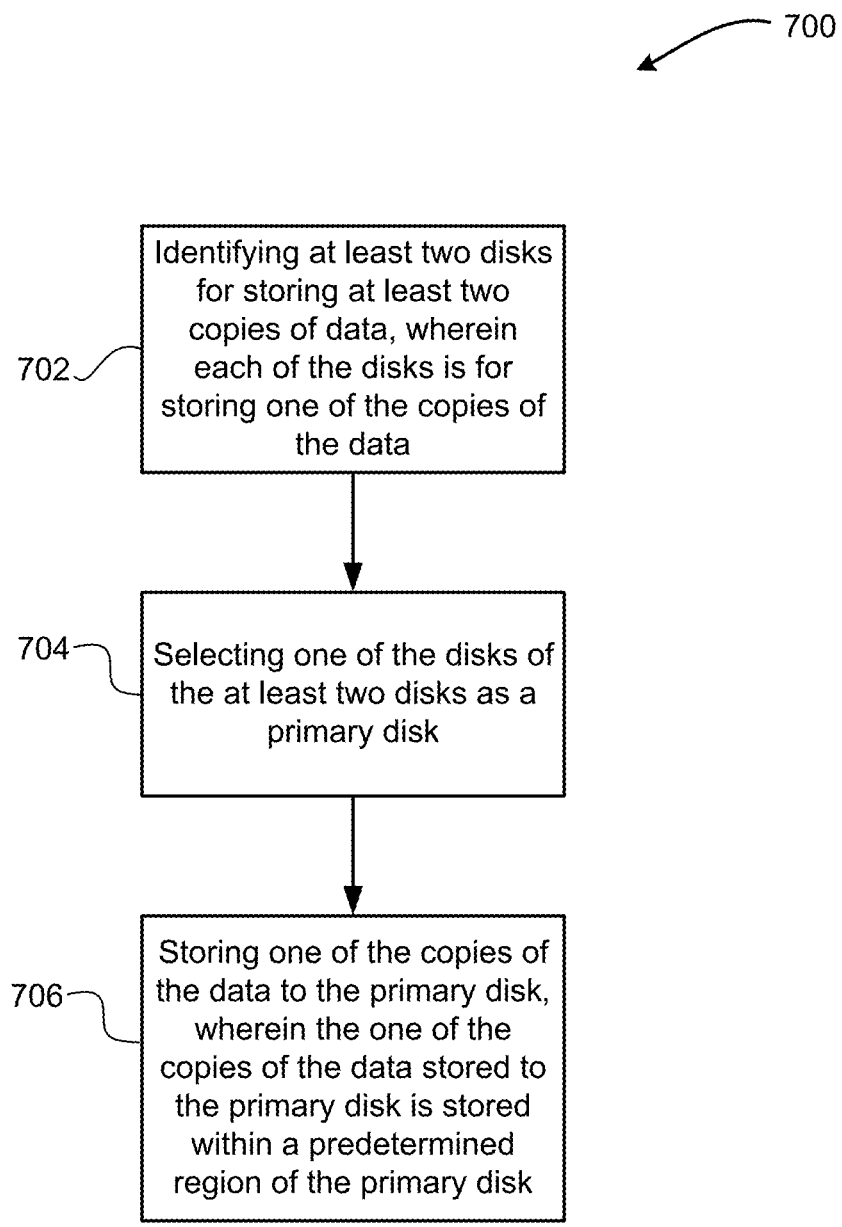
FIG. 7 illustrates a method for optimizing storage of data copies, in accordance with one embodiment.

Now referring to FIG. 7, a flowchart of a method 700 for optimizing storage of data copies is shown according to one embodiment. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, at operation 702 at least two disks are identified for storing two copies of data, where each of the disks is for storing one of the copies of the data. As used herein, the data may include any information that has been translated for moving or processing. For example, the data may be formatted for block, file, or object storage. Each of the copies of the data may comprise a unique instance of the data. Still yet, in one embodiment, each of the disks may comprise a separate hard disk drive.

Additionally, at operation 704, one of the disks is selected, from the identified at least two disks, as a primary disk. Further, at operation 706, one of the copies of the data is stored to the primary disk. The one of the copies of the data stored to the primary disk is stored within a predetermined region of the primary disk.

In various embodiments, the primary disk may be divided into two or more regions. In such embodiments, the predetermined region of the primary disk may include one of the two or more regions. In particular, the predetermined region may include a first $1/n$ of an area of the primary disk. For example, the predetermined region may include a first ¼, ⅓, or ½ of an area of the primary disk. Accordingly, the copy of the data stored to the primary disk may be stored within the first ¼, ⅓, or ½, respectively, of the area of the primary disk.

In one embodiment, the copies of the data other than the copy stored to the primary disk may be backup copies of the data. For example, these copies of the data may be accessed in the event that the copy of the data stored to the primary disk becomes inaccessible. Thus, the copies of the data other than the copy stored to the primary disk may be stored to one or more other disks of the at least two disks.

In another embodiment, a read request for the data may be received after storing the copies of the data. The read request may include any communication that attempts to access the data. In one embodiment, a request for the data may be in the form of a REST request, or in the form a file or object that is used as a place to convey the request.

The read request for the data may be forwarded to the primary disk. Because the copy of the data stored to the primary disk has been stored in the predetermined region of the primary disk, the primary disk may be able to seek to, and access, the copy of the data quicker than any of the other disks storing a copy of the data. This may be because the primary disk does not need to seek beyond a first ¼, ⅓, ½, etc. of the primary disk for accessing the copy of the data stored to the primary disk. If the primary disk is unavailable, then the request for the data may be forwarded to another one of the disks, i.e., backup disks, storing a copy of the data.

In this manner, the storage of the copies of the data may be optimized to reduce the time of subsequent seeks and retrievals of the data. In object-based storage systems, where the data may be copied multiple times, rather than striped in RAID fashion, the use of a primary disk with reduced seek and/or access times may have a significant impact on the overall efficiency of the system.

For example, within a distributed object store and file system (e.g., Ceph, etc.), data is typically copied at least in triplicate to disk. If the data is stored in triplicate, and a copy of the data is stored on a primary disk such that a read head accessing the copy on the primary disk only traverses, at most, $1/n$ of the primary disk, then any request for the data may be directed to the primary disk for ensuring rapid access. The other $(n-1)/n$ (i.e., ¾, ⅔, ½, etc.) of the given disk may be reserved for backup copies of other data.

Additionally, in one embodiment, a bulk read request for data may be received from a client. The bulk read request may request access to multiple files or objects (e.g., multiple GETs, etc.). The bulk read request may be parsed into smaller requests for data, and then each of the smaller requests may be sent to the disk designated as the primary disk for the data identified in the request. Because few or no read heads may traverse beyond a first $1/n$ of its respective disk, the bulk read request may be rapidly dispatched.

Still yet, in one embodiment, the smaller requests may be ordered/re-ordered in a manner that minimizes disk seek times, and/or disk spin latency. For example, if a bulk request results in 500,000 reads total across all disks, including 10,000 reads to a particular disk, the reads may be ordered in a manner that ensures read heads of the particular disk traverse a predetermined region (e.g., a first half, a first third, a first quarter, etc.) of the particular disk only one time. In other words, the reads for the particular disk may be sequenced in such a manner that the read heads travel in a single direction only once with as few gaps as possible.

In another embodiment, the determined order may be returned back to a client that originated the bulk read request. The determined order may be returned back to the client as an annotation of the smaller requests, where the annotation provides an optimal order to read blocks of data. In this way, a reader across a network (e.g., the Internet) may perform the reads in the optimal order, thereby beginning receipt of data across the network as quickly as possible.

Thus, the method 700 of FIG. 7 provides a manner of storing data to disk in a way that can minimize subsequent seek times, and optimize overall system performance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for efficiently managing storage in a multi-tiered storage system, the computer program product comprising a computer readable storage medium having program instructions embodied therewith, the program instructions executable by a processor to cause the processor to perform a method comprising:
   receiving, by the processor, a command from an application, wherein the command is directed to at least one object;
   determining, by the processor, storage for the at least one object in a multi-tiered storage system based on the command; and
   storing, by the processor, the at least one object in accordance with the determined storage,
   wherein the command includes at least one of collocation and anti-collocation guidance from the application for the at least one object,
   wherein the command identifies an amount of time during which the at least one object is not to be accessed.

2. The computer program product of claim 1:
   wherein the command tags the at least one object as cold;
   wherein the storage for the at least one object is determined based on the at least one object being tagged as cold; and
   wherein storing the at least one object in accordance with the determined storage includes moving the at least one object to a lower storage tier of the multi-tiered storage system,
   wherein the lower storage tier includes magnetic tape.

3. The computer program product of claim 2, wherein the command is included in metadata of a container of the at least one object and/or a storage tier, wherein the at least one object is stored in accordance with the determined storage during execution of one or more information lifecycle management policies.

4. The computer program product of claim 1, wherein the program instructions are executable by the processor to cause the processor to perform the method comprising:
   receiving a second command from the application, wherein the second command is directed to at least one other object of the object-based storage system;
   determining storage for the at least one other object in the multi-tiered storage system based on the second command; and
   storing the at least one other object in accordance with the storage determined based on the second command,
   determining storage for the at least one other object includes:
      determining whether each of the at least one other object is located on a lower one of the at least two different storage tiers,
   wherein storing the at least one other object in accordance with the storage determined based on the second command includes:
      moving each of the objects determined as being located on the lower one of the at least two different storage tiers to a higher one of the at least two different storage tiers, wherein the multi-tiered storage system is an object-based storage system,
   wherein the lower storage tier includes magnetic tape.

5. The computer program product of claim 4, wherein the second command includes an XML document that identifies the at least one object.

6. The computer program product of claim 4, wherein the higher storage tier includes a storage medium selected from the group consisting of: flash storage and a hard disk drive.

7. The computer program product of claim 1, wherein the command includes a document that identifies a size of the at least one object.

8. The computer program product of claim 7:
   wherein the storage for the at least one object is determined based on the size of the at least one object; and
   wherein the storage for the at least one object is allocated for the at least one object based on the size of the at least one object prior to receiving the at least one object.

9. The computer program product of claim 1, wherein the command only includes collocation guidance.

10. The computer program product of claim 1, wherein the command only includes anti-collocation guidance.

11. A computer-implemented method for improving storage efficiency and reducing access request times in an object-based storage system, comprising:
   receiving a command from an application, wherein the command is directed to at least one object of the object-based storage system;
   determining storage for the at least one object in a multi-tiered storage system based on the command; and
   storing the at least one object in accordance with the determined storage,
   wherein the command includes collocation and/or anti-collocation guidance from the application for the at least one object,
   wherein the object-based storage system is a multi-tiered storage system having at least two different storage tiers,
   wherein the command identifies an amount of time during which the at least one object is not to be accessed, and tags the at least one object as cold,
   wherein the storage determined for the at least one object is a lower storage tier of the at least two different storage tiers,
   wherein the lower storage tier includes magnetic tape.

12. The computer-implemented method of claim 11, wherein determining storage for the at least one object includes determining a storage location on one of the at least two different storage tiers.

13. The computer-implemented method of claim 11, wherein the command is included in an XML document.

14. The computer-implemented method of claim 11, wherein the command is included in metadata of a container of the at least one object and/or a storage tier.

15. The computer-implemented method of claim 11, comprising:
receiving a second command from the application, wherein the second command is directed to at least one other object of the object-based storage system;
determining storage for the at least one other object in the multi-tiered storage system based on the second command; and
storing the at least one other object in accordance with the storage determined based on the second command,
wherein the second command includes an XML document which identifies a set of objects,
wherein determining storage for the set of objects identified in the XML document includes:
determining whether each of the objects in the set of objects is located on a lower one of the at least two different storage tiers,
wherein storing the at least one other object in accordance with the storage determined based on the second command includes:
moving each of the objects in the set of objects determined as being located on the lower one of the at least two different storage tiers to a higher one of the at least two different storage tiers,
wherein the lower storage tier includes magnetic tape,
wherein the higher storage tier includes a storage medium selected from the group consisting of: flash storage and a hard disk drive,
wherein the second command is included in metadata associated with the at least one other object.

16. The computer-implemented method of claim 15, comprising:
receiving a request from the application to determine an order in which to retrieve a plurality of the objects, wherein the plurality of objects are listed in a message received as a part of the request;
determining the order in which to retrieve the plurality of objects based on where each object is stored in a storage tier of the multi-tiered storage system;
creating a list of the plurality of objects according to the determined order; and
passing the list of the ordered objects back to the application.

17. The computer-implemented method of claim 16, wherein the order in which to retrieve the plurality of objects is determined for reducing an access time associated therewith in comparison to an access time associated with retrieving the plurality of objects in an order listed in the request.

18. The computer-implemented method of claim 11, wherein the at least one object includes a plurality of the objects, wherein the collocation and/or anti-collocation guidance identifies a sequencing of the objects based on a construct selected from the group consisting of: one or more directories associated with the objects, and one or more users associated with the objects.

* * * * *